United States Patent [19]
Döhring

[11] Patent Number: 5,213,072
[45] Date of Patent: May 25, 1993

[54] VALVE ACTUATING MECHANISM IN THE CYLINDER HEAD OF A COMBUSTION ENGINE

[75] Inventor: Klaus Döhring, Heidelberg, Fed. Rep. of Germany

[73] Assignee: Firma Carl Freudenberg, Weinheim/Bergstr., Fed. Rep. of Germany

[21] Appl. No.: 885,131

[22] Filed: May 18, 1992

[30] Foreign Application Priority Data

May 28, 1991 [DE] Fed. Rep. of Germany ....... 4117406

[51] Int. Cl.$^5$ .............................. F01L 1/14; F01L 3/10
[52] U.S. Cl. ................................ 123/90.48; 123/90.52; 123/90.37; 123/90.65; 74/569
[58] Field of Search ............... 123/90.37, 90.48, 90.49, 123/90.51, 90.52, 90.55, 90.65, 90.67; 74/569

[56] References Cited

U.S. PATENT DOCUMENTS

| | | | |
|---|---|---|---|
| 1,434,473 | 11/1922 | Arnold | 123/90.67 |
| 1,857,005 | 5/1932 | Schotthoefer | 123/90.67 |
| 2,650,579 | 9/1953 | Bernight | 123/90.67 |
| 3,675,631 | 7/1972 | Hixson | 123/90.52 |
| 3,941,102 | 3/1976 | Bareham | 123/90.67 |
| 4,201,162 | 5/1980 | Speckhart | 123/90.67 |
| 5,003,940 | 4/1991 | Hixson | 123/90.52 |
| 5,018,488 | 5/1991 | Randle | 123/90.55 |
| 5,058,541 | 10/1991 | Shibata et al. | 123/90.65 |

FOREIGN PATENT DOCUMENTS

| | | | |
|---|---|---|---|
| 2009461 | 9/1971 | Fed. Rep. of Germany . | |
| 3808542 | 10/1988 | Fed. Rep. of Germany . | |
| 2364328 | 4/1978 | France | 123/90.65 |
| 283811 | 11/1990 | Japan | 123/90.37 |
| 394562 | 6/1933 | United Kingdom | 123/90.67 |

Primary Examiner—E. Rollins Cross
Assistant Examiner—Weilun Lo
Attorney, Agent, or Firm—Kenyon & Kenyon

[57] ABSTRACT

A valve actuating mechanism in the cylinder head of a combustion engine is disclosed. The mechanism has a cup-type tappet lifter which is attached to a valve stem, a retaining mechanism affixed to the valve stem and the tappet lifter, and at least one valve spring, which is braced on one side on the cylinder head and on the other side against the valve spring retainer disk. The cup-type tappet lifter and the valve spring retainer disk are formed in one piece. Several mechanisms are disclosed for retaining the tappet lifter onto the valve stem.

14 Claims, 5 Drawing Sheets

VALVE ACTUATING MECHANISM IN THE CYLINDER HEAD OF A COMBUSTION ENGINE

The present invention relates to a valve actuating mechanism in the cylinder head of a combustion engine. The mechanism comprises a cup-type tappet lifter which can be inverted on to a valve stem of a valve, a retaining mechanism affixed to the valve stem and the tappet lifter, and at least one valve spring. The valve spring is braced on one side in the cylinder head and on the other side against the tappet lifter.

German Published Patent Application 38 08 542 discloses a valve actuating mechanism. According to this application, the valve spring retainer disk is a piston. The piston is affixed to the valve stem and sealingly contacts the inner surface of a cup-type tappet lifter through seals arranged on the radially outer surface of the piston. The result is a parallel installation in terms of force of a mechanical closing spring and a pneumatic closing spring which depends upon the prevailing engine speed for a reliable actuation of the valve. In this construction, however, the valve stem has a comparatively long length. This results in lessened durability, a greater valve mass to be accelerated, as well as a relatively difficult tolerancing of the fits of the various parts.

German Published Patent Application 20 09 461 discloses a closing device for closing and opening cam-controlled valves. This device is relatively complicated and costly to manufacture. Apart from the comparatively complicated inner structure of the valve actuating mechanism, the device's overall height is not very satisfactory if it is desired to have cylinder heads of the lowest possible construction and good aerodynamics for the motor vehicle in which the combustion engine is used.

The object of the present invention is to develop a valve actuating mechanism that allows the overall height to be decreased by using shorter mechanism which is not as mechanically stressed at the valve stems. A further object is to reduce the masses to be accelerated, and to allow the mechanism to be manufactured more economically.

In the valve actuating mechanism according to the present invention, the cup-type tappet lifter and the valve spring retainer are formed in one piece. This results in a small number of component parts, a clear reduction in the masses in the valve actuating mechanism to be accelerated, and a lower overall height of the cylinder head.

The valve spring of the present invention can be a mechanical compression spring. It is also possible, however, to construct the valve spring of a pneumatic design, or to combine the mechanical valve spring with the pneumatic valve spring. When pneumatic valve springs or a combination of pneumatic and mechanical valve springs are used, care must be taken so that an adequate pressure can build up in the cavity. This is because the cavity is limited on one side by the cup-type tappet lifter and on the other side by the cylinder head. The valve must be able to close properly, even at high rotational speeds. A pneumatic valve spring allows the possibility of regulating the rigidity of the spring by adjusting the gas pressure, for example in dependence upon rotational speed. The cup-type tappet lifter is designed on its inside to be used as a contact surface for the valve spring. Mechanical valve springs where, for example, two valve springs are arranged to lie one inside the other in the radial direction are particularly suited for production automobiles. This is equally true of a combination of mechanical and pneumatic valve springs. An exclusively pneumatic valve spring construction is particularly useful when the combustion engine is operated at very high speeds. This is the case, for example, in racing automobiles.

The cup-type tappet lifter can have a two-part design where the first part is formed by an essentially cup-shaped housing and the second part by a clamping device that is mounted with an interference fit or form fit in the housing. According to one embodiment the housing and the clamping device can be screwed to one another. This allows the valve actuating mechanism to be assembled quite simply and disassembled again as needed. To reduce the masses to be accelerated, the cup-type tappet lifter can consist at least partially of a polymeric material. Due to the resulting smaller mass and given the same acceleration of the valve in the axial direction such a construction results in the parts being subjected to less stress and thus less wear. Given the same force and a greater acceleration of the valve this provides an improved efficiency factor for the combustion engine. The valve stem is secured to the cup-type tappet lifter in a way that will allow compressive forces and tensile forces to be transmitted.

When the clamping device and the housing are screwed together, the clamping device can be formed by a hollow cylinder with an external thread on its surface area projecting in the radially outward direction and an at least partially conical inner surface. It is desirable to provide an especially exact, concentric relationship between the cup-type tappet lifter and the valve stem. As a result, it is particularly easy to achieve a non-tilted orientation between the cup-type tappet lifter and the valve stem in the assembly.

Another feature is to form the clamping device by at least two set screws and for the set screws to be mounted at an acute angle to the valve stem in the housing. The clamping device can consists of at least two, but preferably three, set screws which are uniformly distributed around the circumference. The angle to the valve stem preferably is 30° to 60°, although deviation from these figures is possible. The advantage of this set screw arrangement is in the particularly low mass of the valve actuating mechanism.

The cup-type tappet lifter, which at the same time acts as a valve spring retainer disk, can be affixed by at least one adapter to the valve stem. The adapter is arranged in the radial direction between the valve stem and the clamping device. Extending under the adapter is a projection of the housing which extends radially inwardly, against which the adapter is braced. The adapter connects the valve stem and the cup-type tappet lifter in a way that allows both tensile forces as well as compressive forces to be reliably transmitted over a long service life.

When a pneumatic valve spring or an additional mechanical valve spring are used, a first seal can be arranged in the radial direction between the projection of the valve housing and the valve stem. The seal therefore sealingly contacts both parts. To seal off the gap between the cylinder head and the housing, in at least one area, the cylindrical outer surface of the cup-type tappet lifter can have a second seal. The second seal sealingly contacts both the outer surface as well as the cylinder head. Thus, in conjunction with another seal in the direction of the combustion chamber, a gastight pressure chamber is created in which pressure can build up to close the valve. In a known manner, the pressure can be conveyed via a line into the pressure chamber. To improve the performance, an accumulator can be allocated to the line. The functioning of the hydropneumatic design of the valve springs or a mechanical valve spring with a hydraulic transmission element is very similar to the functioning of the pneumatic valve springs or of the pneumatic valve spring combined with a mechanical valve spring, and will not be described in greater detail here.

The adapter is advantageously fixed in a groove in the valve stem in the axial direction and is provided on the side facing the groove with a convex surface and on the opposite side with an at least partially conical surface. This feature produces an exact and tilt-free orientation of the cup-type tappet lifter to the valve stem. The conical surface of the side facing the clamping device allows simple bracing of the two parts against one another. If the conical inner surface and the conical top surface contact one another so that they lie flat against each other, the surface pressure is quite small and uniform. Because of this, economical materials can be used.

If a valve actuating mechanism which has a particularly small mass to be accelerated is desired, three set screws are used which contact the conical top surface in a punctiform. An exact concentric orientation of the cup-type tappet lifter to the valve stem is also possible. However, due to the punctiform contact of the adapter and the set screws, care must be taken so that the materials chosen have sufficient strength.

To allow economical manufacturing, it is practical for the fits and tolerances to have dimensions which are not too small. To achieve this goal, and to compensate for alignment errors, the adapter can have a convex, lens-shaped top surface on the side facing the groove and an L-shaped design on the side facing the clamping device. This design allows the adapter to mate with a corresponding recess in the clamping device. The design also allows the adapter to contact the recess in the axial direction to allow for a slight bracing of the parts. In the radial direction the adapter is oriented with the recess so that it borders on it with clearance. It is also advantageous that a circumferential movement of the valve stem relative to the cup-type tappet lifter can be effected, through which the valve seat is prevented from being subjected to wear on one side. This results in a long service life. On its inner side, the housing is designed as a contact surface for the valve spring. This feature requires a construction that entails a minimum number of parts and a low overall height of the valve actuating mechanism.

The object of the present invention is clarified further in view of the drawings. The drawings depict the individual components, partially in a schematic representation.

Figure 1:
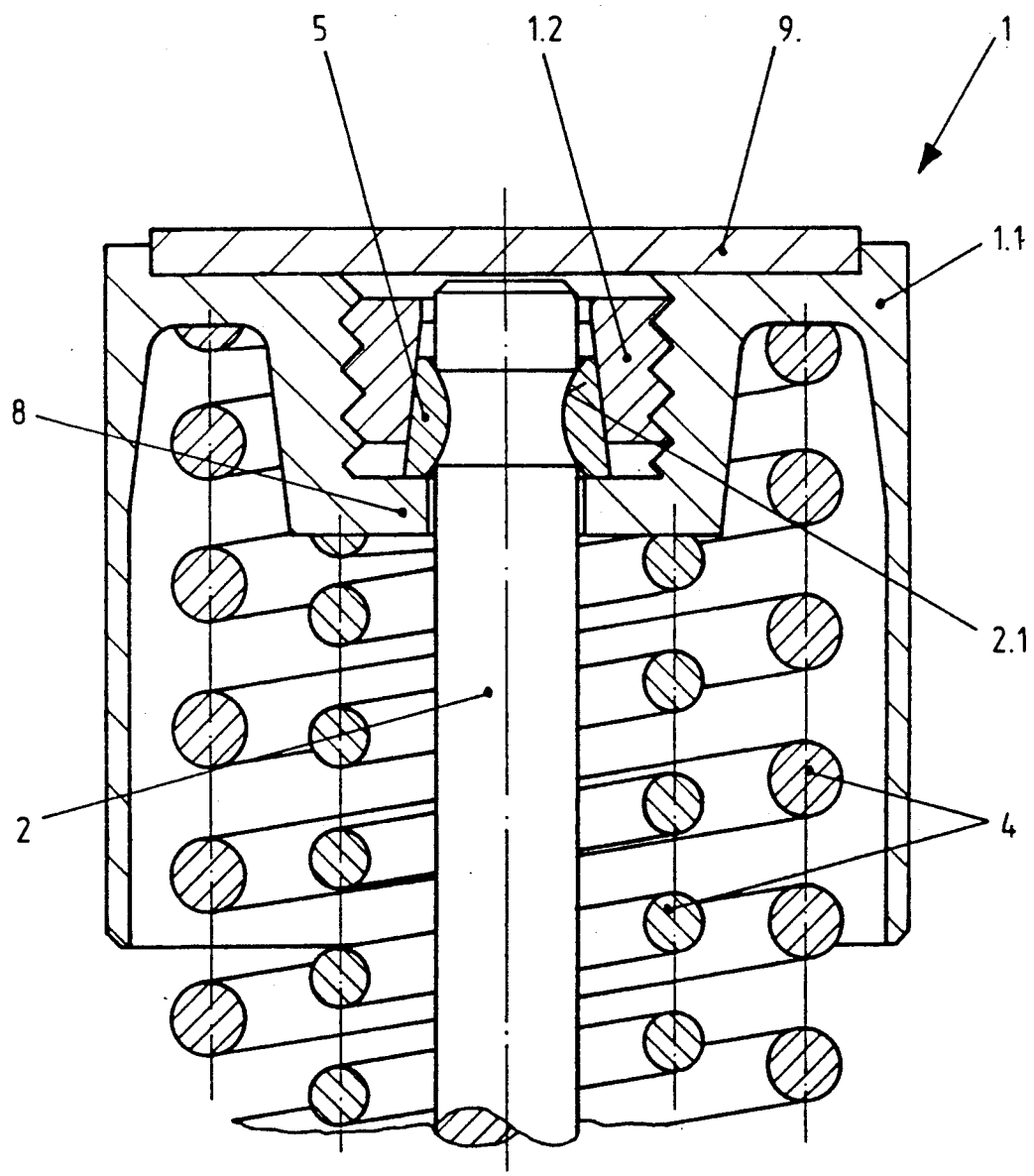
FIG. 1 shows a cross-sectional view of a first embodiment of the present invention.
Figure 2:
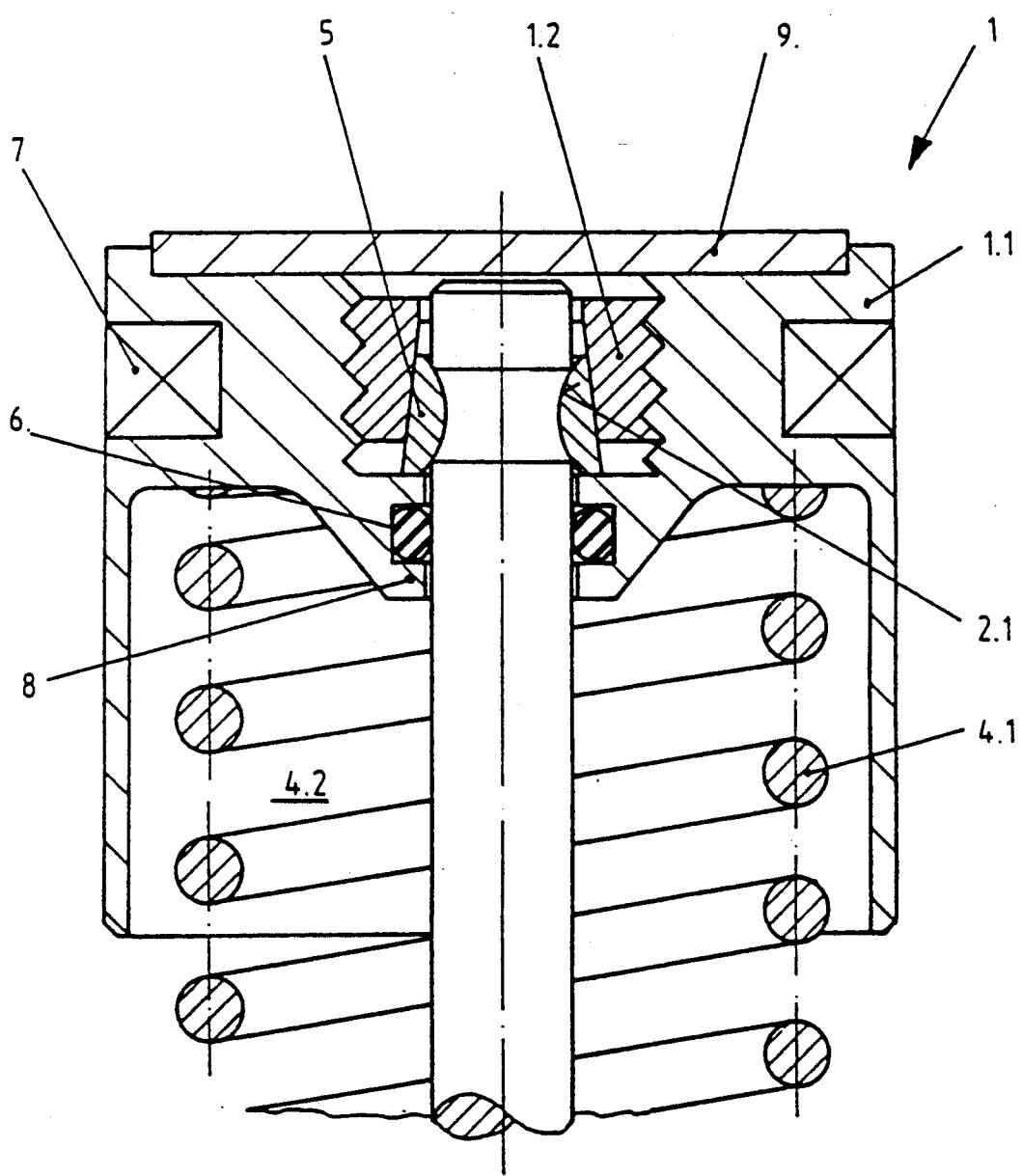
FIG. 2 shows a cross-sectional view of a second embodiment of the present invention.
Figure 3:
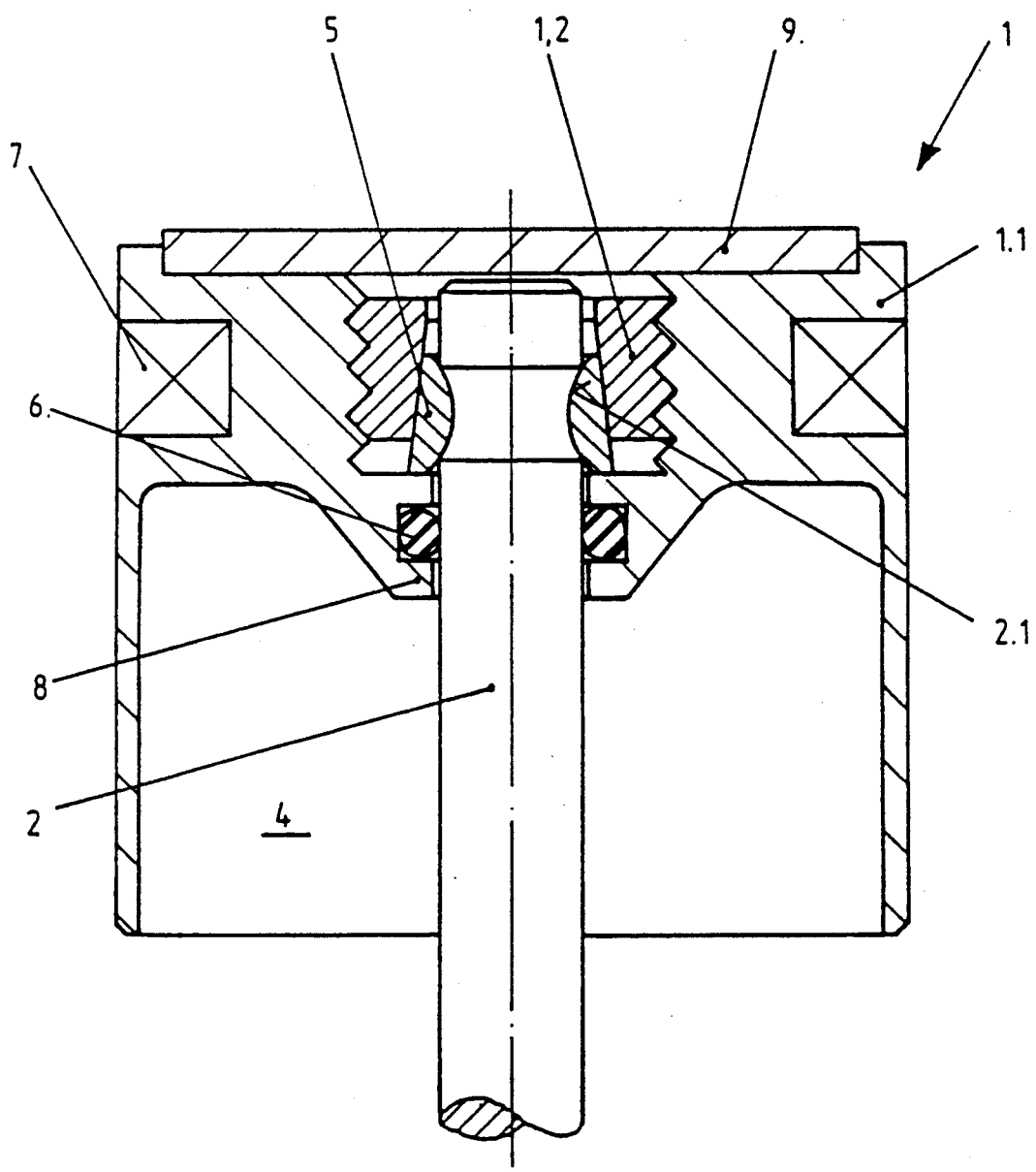
FIG. 3 shows a cross-sectional detail view of a third embodiment of the present invention.

A valve actuating mechanism is depicted in FIGS. 1, 2 and 3 comprising a cup-type tappet lifter 1, which is affixed to a valve stem 2 of a valve. Also depicted are valve springs of varying designs, which are braced in on one side in the cylinder head (not depicted here) and on the other side against the cup-type tappet lifter 1. The cup-type tappet lifter 1 functions as a valve spring retainer disk.

FIGS. 1 to 5 depict an arrangement for securing the valve stem to the cup-type tappet lifter, which in the present invention can transmit compressive forces and tensile forces.

In FIG. 1, the adapter 5 has a two-part design and consists of metallic material. It is clamped in the radial direction between the groove 2.1 of the valve stem 2 and the clamping device 1.2, which is screwed into the housing 1.1. Both the adapter 5 and the clamping device 1.2 have contact surfaces which have a conical form and contact one another so that they lie flat against each other. A projection 8, which is formed in one piece with the housing 1.1, is provided as an abutment for bracing the clamping device 1.2 and the adapter 5, and the projection 8 extends on one side under the adapter 5 in the axial direction. A particularly wear-resistant armor plate 9 constitutes a part of the housing 1.1. The armor plate 9 can be designed, for example, as an element for compensating for valve play. The housing 1.1 in FIG. 1 is contacted on the inside in the axial direction by two parallel-functioning mechanical valve springs which lie close to it. This arrangement represents only one potential configuration. Another conceivable arrangement could include only one valve spring 4 braced against the cup-type tappet lifter 1, as shown in FIG. 2. The clamping joint depicted can transmit tensile forces and compressive forces to the greatest possible extent in a manner that is free from play.

The clamping power is determined by the tightening torque in the thread of the housing 1.1 and the clamping device 1.2. When the adapters 5 are designed as shown, forces can also be transmitted in the circumferential direction so that the rotational movement of the cup-type tappet lifter 1 generated by the valve stem 2 is transmitted to the valve. By this arrangement, the valve seat and the armor plate 9 are prevented from being subjected to uneven wear.

The arrangement of the valve actuating mechanism depicted in FIG. 2 differs from that of FIG. 1 because it uses a combination of mechanical valve springs and pneumatic valve springs. The operation is very similar to the operation described above, although the housing 1.1 of the cup-type tappet lifter 1 is supplemented by a first seal 6 and a second seal 7. The first seal 6 is arranged in the projection 8 in the radial direction between this projection and the adjoining valve stem 2 and sealingly contacts these two parts while prestressing them. The second seal 7 is arranged along the axial extent of the housing 1.1 and seals off the gap between a guide sleeve (not depicted here), a component of the cylinder head, and the housing 1.1. This embodiment has the advantage that the mechanical valve spring only needs to be designed to allow it to reliably shift the valve into the closed position in the low rotational-speed range of the combustion engine. Accordingly, the material fatigue of the valve spring 4 is slight, thus preventing the danger of the valve spring 4 breaking. In the higher rotational-speed range, the cup-type tappet lifter can be pressurized in a generally known way by a pneumatic medium. In this situation, it is advantageous that the valve be able to be shifted extremely rapidly into the closed position, without the mechanical stresses. This could occur, for example, with a valve spring of a comparably strong design, which could cause a defect in the valve actuating mechanism.

FIG. 3 depicts a design which is similar to the designs of FIG. 1 and 2, but where the valve spring 4 has a pneumatic construction. In this embodiment, it is advantageous that the rigidity of the valve spring is able to be controlled by gas pressure, for example in dependence upon rotational speed. This variant is particularly suited for combustion engines which are operated at high rotational speeds, such as engines that are used in automobile racing. A valve actuating mechanism constructed in this manner is distinguished by a reliable actuation of the valves at high rotational speeds.

Due to the fact that the cup-type tappet lifter 1 assumes the function of previously known valve spring retainers and also the function of the piston that is otherwise affixed to the valve stem, the refinements according to FIGS. 1 to 3 exhibit a particularly low overall height as the result of a clearly shortened valve stem. This results in easier manufacturing of the device and good working properties in all operating ranges of the combustion engine over a long service life.

Figure 4:
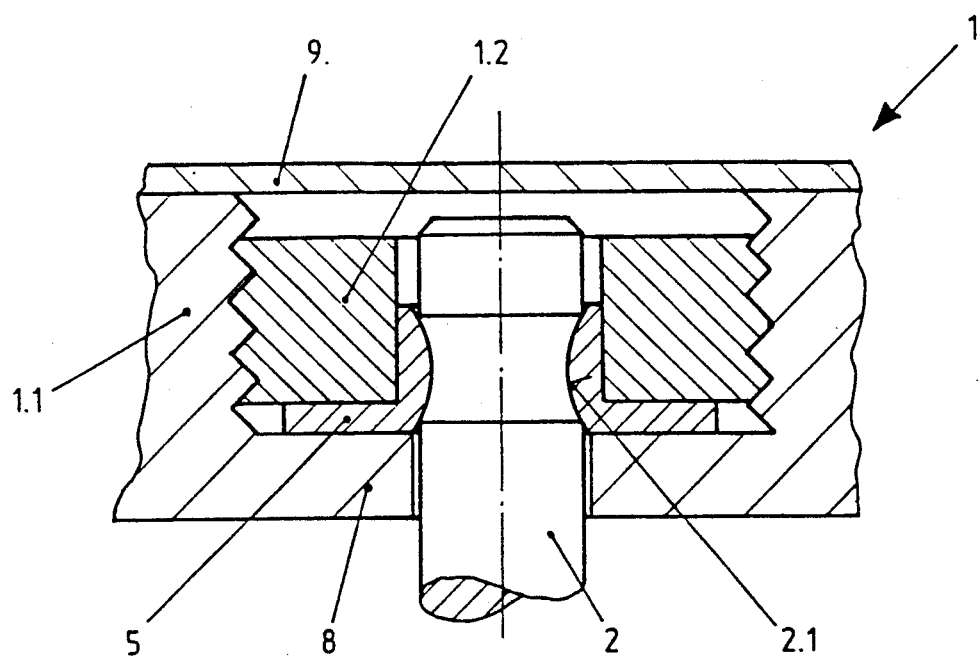
FIG. 4 shows a cross-sectional detail view of a second alternative retaining mechanism.
Figure 5:
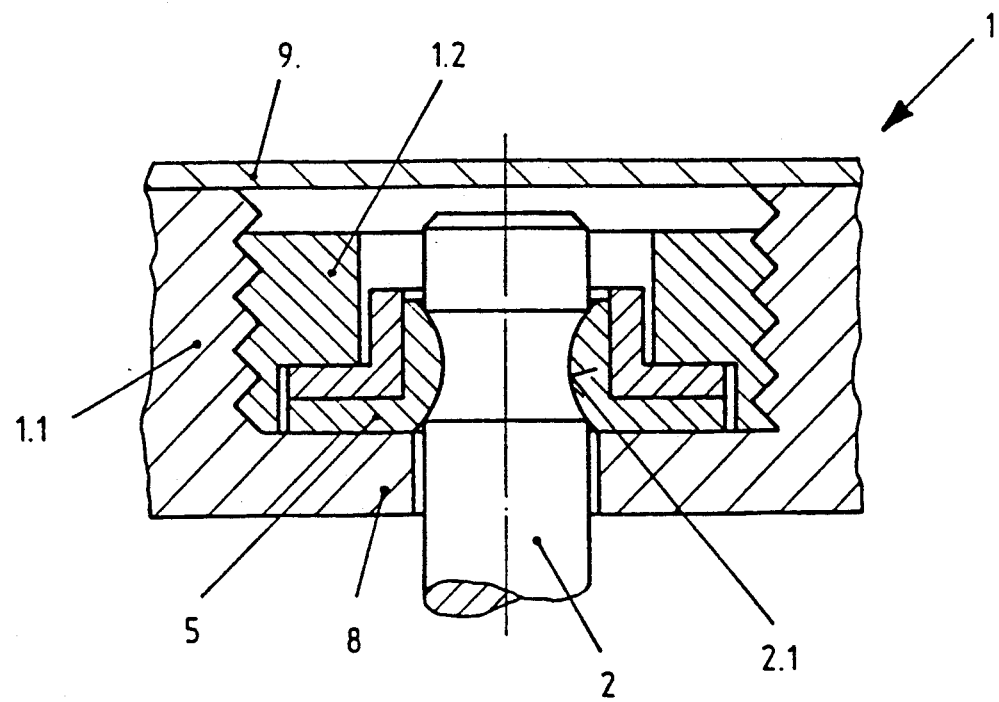
FIG. 5 shows a cross-sectional detail view of a third alternative retaining mechanism.
Figure 6:
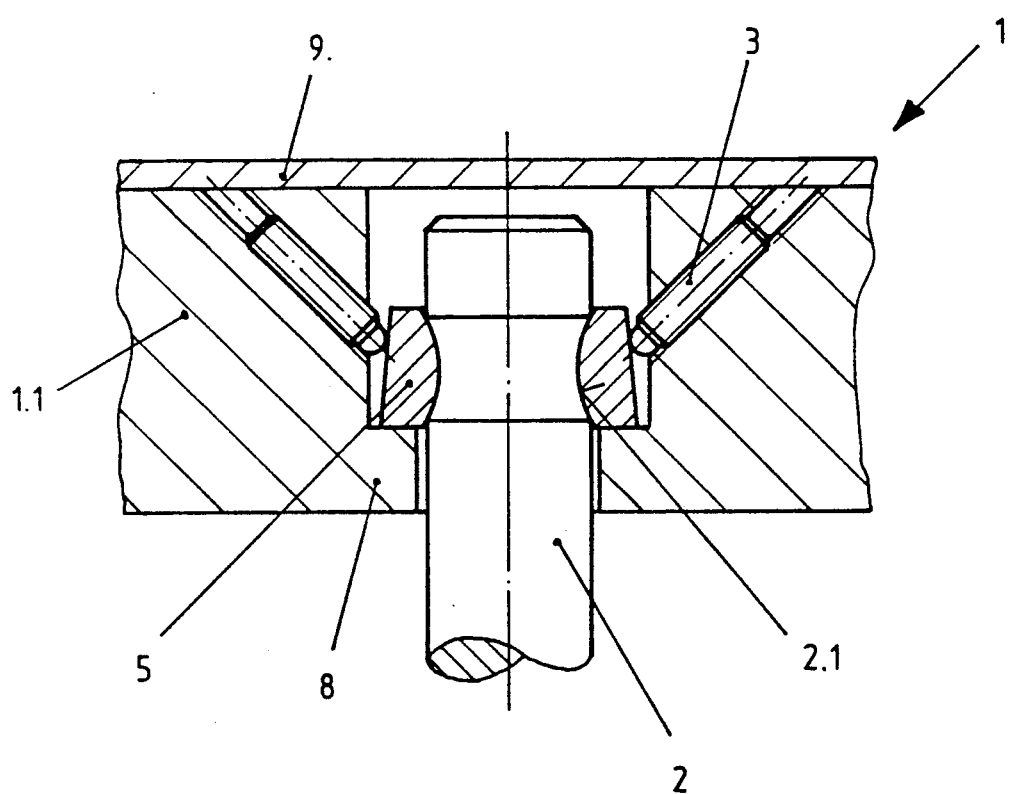
FIG. 6 shows a cross-sectional detail view of a fourth alternative retaining mechanism.

FIGS. 4, 5 and 6 each show a cut-away portion of the cup-type tappet lifter 1, consisting of a housing 1.1 and a clamping device 1.2, as well as the adapter 5, which interconnects the valve stem 2 and the cup-type tappet lifter 1.

FIGS. 4 and 5 each show an adapter 5, which is essentially cylindrical along its radial outer surface and is affixed on one side in a groove 2.1 in the valve stem 2. On the other side the adapter 5 has a projection directed radially outward between the housing 1.1 and the clamping device 1.2. The embodiments of FIGS. 4 and 5 differ from one another in that in FIG. 5 a small radial offset of the valve stem 2 with respect to the cup-type tappet lifter 1 is permissible. Moreover, in these embodiments it is quite easy to effect a circumferential movement of the valve stem 2 relative to the cup-type tappet lifter 1. This can be also achieved when the adapter 5 according to FIG. 1 is used. As a result of the screw joint that is substantially free from play, as shown in FIGS. 4 and 5, a connection is also formed which can transmit tensile forces and compressive forces to the valve stem 2 and, as shown in FIG. 5, which permits small radial movements which allows compensation for alignment errors.

In FIG. 6, the adapter 5 has a two-part design with a conical form along its boundary surface radially outward from the valve stem 2. This surface is connected with the set screws 3, which are screwed in against the adapter 4 at an acute angle of 45°, to prestress the valve stem 2 and the cup-type tappet lifter 1. The set screws 3 are advantageously configured so that they are uniformly distributed over the periphery of the housing 1.1. To attain a small mass to be accelerated and a non-tilted orientation of the cup-type tappet lifter 1 to the valve stem 2, three set screws 3 can be distributed around the periphery of the housing 1.1 so that they are spaced relative to one another at an angle of 120°.

I claim:

1. A valve actuating mechanism comprising:
a tappet lifter having a cupped recess;
a valve stem connected to said tappet lifter;
a retaining mechanism connecting said tappet lifter to said valve stem, having an annular member, a radial outer surface of the annular member being threaded, and an adapter, said adapter contacting a radially inner surface of the annular member and the valve stem, said adapter being arranged radially between the annular member and the valve stem, said adapter having a portion extending below the annular member, said portion being braced against a radially inwardly projecting extension of said tappet lifter; and
a valve spring, the valve spring contacting, and being retained by, the cupped recess in the tappet lifter.

2. The valve actuating mechanism of claim 1, wherein:
the valve spring comprises a mechanical compression spring.

3. The valve actuating mechanism of claim 1, wherein:
the valve spring comprises a pneumatic spring.

4. The valve actuating mechanism of claim 1, wherein:
the valve spring comprises a combination of a mechanical compression spring and a pneumatic spring.

5. The valve actuating mechanism of claim 1, wherein:
the retaining mechanism is retained on the tappet lifter with an interference or form fit.

6. A valve actuating mechanism of claim 1, wherein the radially inner surface of the annular member is frustoconical, a radially outer surface of the adapter is frustoconical, the radially inner surface of the annular member and the radially outer surface of the adapter contacting one another so as to lie flat against one another.

7. The valve actuating mechanism of claim 1, wherein:
the radially inner surface of the annular member is frustoconical.

8. The valve actuating mechanism of claim 1, wherein:
the valve actuating mechanism further comprises a seal arranged between the radially inwardly projecting extension and the valve stem.

9. The valve actuating mechanism of claim 1, wherein:
the tappet lifter has an annular seal arranged on its radially outer periphery, the annular seal being adapted to engage a cylinder head.

10. The valve actuating mechanism of claim 1, wherein:
the adapter has a convex shape on its radially inward surface, said convex shape cooperating with a concave groove in the valve stem.

11. A valve actuating mechanism comprising:
a tappet lifter having a cupped recess;
a valve stem connected to said tappet lifter;
retaining mechanism connecting said tappet lifter to said valve stem, and having at least one set screw being oriented at an acute angle to the valve stem; and
a valve spring, the valve spring contacting, and being retained by, the cupped recess in the tappet lifter.

12. The actuating valve mechanism of claim 11, wherein the at least one set screw is oriented at an angle of 30° to 60° to the valve stem.

13. The actuating valve mechanism of claim 11, further comprising a plurality of set screws said set screws being arranged in a punctiform.

14. The valve actuating mechanism comprising:
a tappet lifter having a cupped recess;
a valve stem connected to said tappet lifter;
a retaining mechanism connecting said tappet lifter to said valve stem, said retaining mechanism having at least one set screw being oriented at an acute angle of 30° to 60° to the valve stem; and
a valve spring, the valve spring contacting, and being retained by, the cupped recess in the tappet lifter.

* * * * *